United States Patent [19]

Lestradet

[11] 4,023,020
[45] May 10, 1977

[54] WHEELED VEHICLE WITH CONTROLLED-OUTPUT SPREADER SYSTEM

[76] Inventor: Maurice C. J. Lestradet, 291 rue du Marechal Delattre de Tassigny, Fere Cahmpenoise, France, 51230

[22] Filed: Apr. 4, 1975

[21] Appl. No.: 565,118

[30] Foreign Application Priority Data

Apr. 4, 1974 France .................... 74.12009

[52] U.S. Cl. .................... 235/151.2; 222/76; 222/178; 239/155
[51] Int. Cl.² .................... G06G 7/50; B05B 9/06
[58] Field of Search .......... 235/151.2; 222/76, 160, 222/178, 318; 239/155, 156, 159, 162

[56] References Cited

UNITED STATES PATENTS

| | | | |
|---|---|---|---|
| 3,398,861 | 8/1968 | Ulrich | 222/178 |
| 3,459,375 | 8/1969 | Goffin | 239/155 |
| 3,550,854 | 12/1970 | Fischer | 239/155 |
| 3,707,305 | 12/1972 | de Kinkelder | 239/155 |
| 3,782,634 | 1/1974 | Herman | 222/178 |
| 3,792,709 | 2/1974 | Johnson, Jr. et al. | 222/178 |
| 3,877,645 | 4/1975 | Oligschlaeger | 239/155 |

FOREIGN PATENTS OR APPLICATIONS

| | | | |
|---|---|---|---|
| 832,854 | 1938 | France | 222/178 |
| 1,016,172 | 1950 | France | 222/178 |

Primary Examiner—Felix D. Gruber
Attorney, Agent, or Firm—Weiser, Stapler & Spivak

[57] ABSTRACT

In a vehicle-carried spreader system, a regulator valve controls a regulator conduit inserted between the output of a reservoir and a distribution chamber. A servo operates the valve in response to comparison of a chamber pressure manometer signal with a reference signal which is a function of vehicle speed, desired spreader output and type of spray nozzles used.

12 Claims, 6 Drawing Figures

WHEELED VEHICLE WITH CONTROLLED-OUTPUT SPREADER SYSTEM

The invention relates to a wheeled vehicle carrying a spreader arrangement whose output is controlled by the speed of vehicle movement. This type of vehicle may be used in agriculture, e.g. to spray liquids such as fertilizers or insecticides.

Vehicles of this type are known, in which the speed is measured at a non-driving wheel, so that the measuring system does not cause slippage of the wheel.

Vehicles are also known in which the opening of a valve is controlled by an electronic system to avoid the use of ball or inertia type governors, which are subject to undesired variations due to vehicle acceleration forces.

These systems generally require that the operator determine, in accordance with a pre-established program, the type of spray nozzle with which to outfit the spreader manifold, and also the average rate of spraying as a function of the quantity of material to be spread. In response to these inputs, a proportional regulator holds a valve to a predetermined setting.

This requires that the machine operator perform a certain number of operations, which it would be desirable to minimize by automating them as much as possible.

It is an object of the invention to overcome these prior art drawbacks.

This, and other objects which will appear are accomplished in accordance with the present invention by employing a wheeled vehicle carrying a spreader system whose output is controlled by its speed. The system comprises a reservoir containing the material to be spread, a pump connected to the reservoir outlet to draw material from it and transfer same into a distribution chamber. A spreader manifold is connected to the outlet of the distribution chamber. A regulator conduit connects the reservoir to the supply piping between the outlet of the pump and the inlet of the distribution chamber. Within this regulator conduit, there is a regulator valve actuated by a servo motor supplied with power from an electronic system as a function of two quantities. One of these is the speed of the vehicle, as measured by a detector at a non-driving wheel of the vehicle. The other is a reference value. A manometer continuously measures the pressure in the distribution chamber and provides a bucking signal to a comparator forming part of the above-mentioned electronic system, where it is compared with a reference signal provided by a computer element. That signal is a function of the speed of the vehicle and of the quantity of material to be spread per unit of surface area. The latter quantity is determined by input settings through input devices which set up the quantity of material to be spread and the type of nozzles with which the spreader manifold is outfitted.

As a result, the quantity of material spread is, in effect, proportional to vehicle speed. This is particularly so because the comparison is made between a reference signal and a bucking signal which is a function of a variable measured at one of the latest stages of the system, and also because the pressure in the distribution chamber is controlled by the volume of material flowing between that chamber and the reservoir. Moreover, control of this return fow volume minimizes the system complexity needed to achieve control, and consequently its cost and the risk of malfunction.

It is a feature of the invention that the spreader system is equipped with a regulator comprising a comparator which receives a reference signal and a pressure signal, and at least one error detector providing an error signal to a control circuit for a servo motor, that signal being provided at intervals determined by a voltage-frequency converter and cascaded modulator, the said intervals becoming longer as the pressure signal approaches the reference signal in magnitude.

Also, when the measured pressure approaches the reference level, the pressure is given time to stabilize between successive adjustments of the control valve, and this provides excellent servo stability.

For further details, reference is made to the description which follows in the light of the accompanying drawings wherein.

Figure 1:
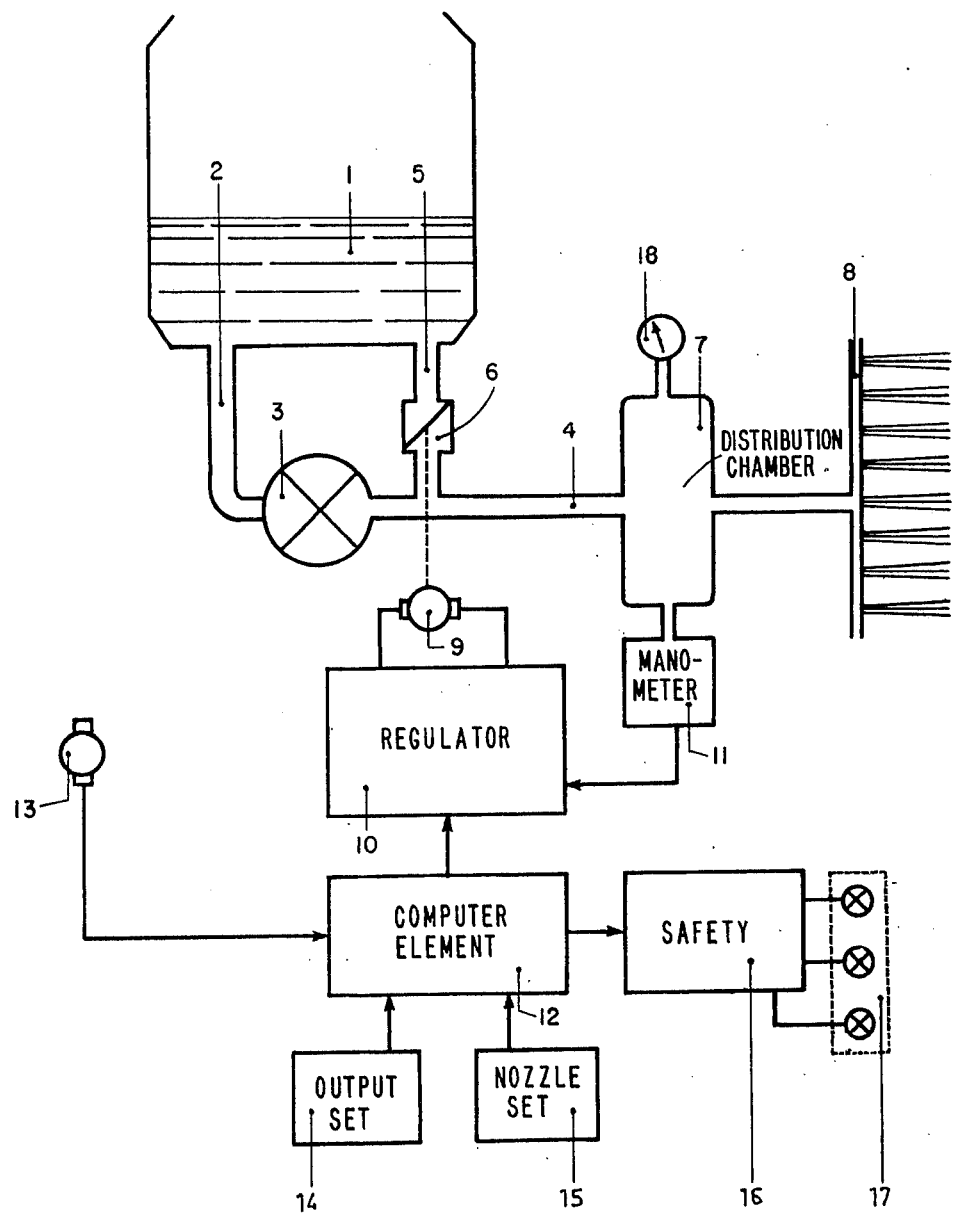
FIG. 1 is a block diagram of a spreader system for a vehicle embodying the invention.

Referring to FIG. 1, a reservoir 1 contains the liquid to be spread. It is provided with means (not shown) permitting inspection of the liquid level or the quantity of spread liquid. Reservoir 1 is connected through conduit 2 to the inlet pump 3 which may, for example, be of centrifugal type, and whose outlet is in turn connected to a supply conduit 4. Supply conduit 4 is further connected to reservoir 1 through a regulator conduit 5, equipped with regulator valve 6. Downstream in conduit 4 there is a distribution chamber 7 supplied thereby with liquid to be spread and whose outlet is in turn connected to a sprayer manifold 8, equipped with spraying means such as nozzles.

The degree of opening of regulator valve 6 is determined by servo motor 9. Regulator 10 supplies power to servo motor 9, as needed, from a source not shown in the drawing, e.g., the storage battery of the tractor.

Regulator 10 receives electric signals, on the one hand, from manometer 11 which senses the pressure in distribution chamber 7 and, on the other hand, from computer element 12. The signals from computer element 12 are determined in part by the speed measured by a speedometer 13 which may, for example, comprise a tachometer generator electrically connected to computer element 12 and, in part, by the settings of a liquid output setting means 14 and a type-of-nozzle setting means 15.

Computer element 12 also supplies signals to a safety element 16, provided with a visual indicator arrangement 17 which displays to the driver of the tractor, or of the spreader pulling means, indications of a normal condition, or a condition calling for acceleration, or one calling for slowing down, depending on the excursions of the regulator. This visual indicator arrangement 17 is preferably in the form of three signal lights, of which one is always lit to show that the system is functioning.

An indicating manometer 18 for visually indicating the pressure in distribution chamber 7 makes it possible to regulate this pressure continuously, independently of the operation of manometer 11 which functions electrically. The speed may also be displayed by means of a visual speed indicator (not shown) either dependently upon or independently of the potential supplied by speed detector 13. Speed detector 13 is mounted to sense the speed of a non-driving wheel of the spreader, so that this measurement is not distorted by possible skidding. The distance traversed may also be measured at this point, for the same reason, and may be visually indicated by an appropriate device (not shown).

If the measurement is performed by a tachometer generator, then rotation of its rotor is obtained by an idler (not shown) driven in turn by the rotation of a non-driving wheel.

By simultaneously observing the liquid level via its display means, and the distance traversed by the spreader, the operator is able to monitor the course of the spraying operation.

Regulator 10 is provided with a reference signal from computer element 12, to which there are applied two control signals, respectively derived from control elements 14, 15, which are manual and may be accessible on the front face of the control box. Control means 14 permits setting in the output to be provided by the spreader. Control means 15 permits setting in the type of spray nozzle use, whose configuration obviously influences the quantity of liquid dispensed.

The design of computer element 12 is determined by a number of parameters, notably the relation between the pressure P in distribution chamber 7, the quantity Q of liquid dispensed (expressed in liters), the vehicle speed (in kilometers per hour), the surface to be covered (in hectares), a coefficient $k$ characteristic of the nozzle used along the dispensing manifold and the area covered by the nozzle in a single pass of the vehicle. Assuming that area to be 0.50 meters and solving for output per hectare, the equation is:

$$P = \left(\frac{Qv}{1200k}\right)^2 \quad (1)$$

Computer element 12 thus must develop a reference potential which determines the intensity of the pressure. This reference potential, which is applied to regulator 10 controlling the opening of regulator valve 6, is therefore a function of the quantity of product to be spread, expressed in meters per hectare per nozzle attached to manifold 14, and of the coefficient $k$ set in by means of device 15. It is also a function of the speed measured by detector 13. It this detector is a tachometer generator making 1 revolution per meter of ground traversed and delivering 50V for a speed of 1000 revolutions per minute, the potential obtained will equal 0.833 V per kilometer per hour.

If m denotes the composite of numerical coefficients forming part of the expression defining P, then one obtains:

$$P = \frac{(m\,Q\,v)^2}{(k)} \quad (2)$$

Figure 2:
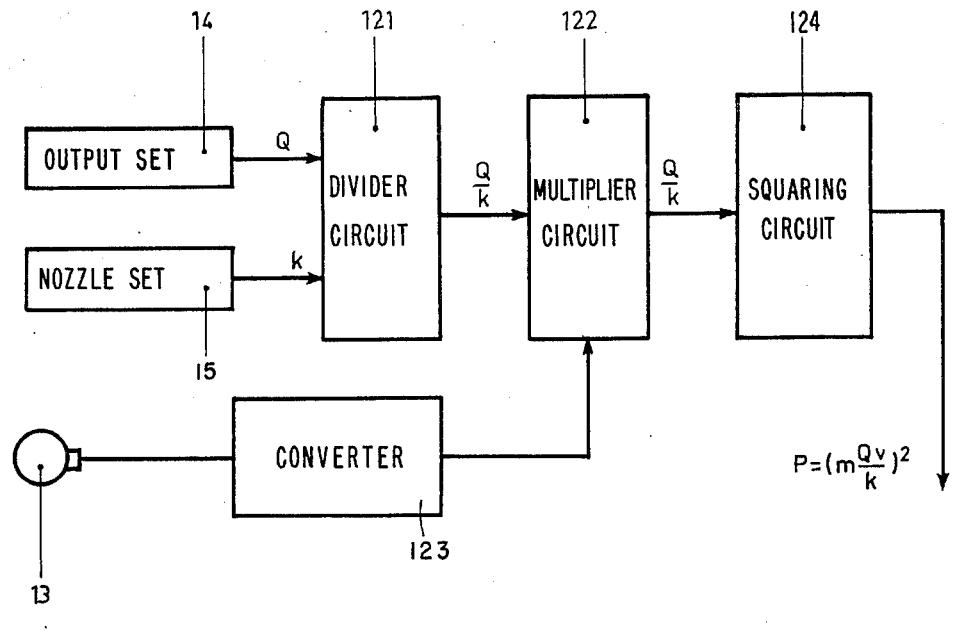
FIG. 2 is a block diagram of a computer element suitable for the spreader system.

Computer element 12 comprises (see FIG. 2) a dividing circuit 121 connected to the setting means 14, 15 to carry out the division Q/K. It further comprises a multiplier circuit connected on the one hand to the output of divider circuit 121 and, on the other hand, to the output of a converter 123 which provides a potential corresponding to the speed of the vehicle. The multiplier circuit 122 then effects the operation $$\frac{Q}{k} \times v.$$

A squaring circuit 124 connected to the output of multiplier circuit 122 effects the operation $$\frac{Q}{k} v \times \frac{Q}{k} v.$$

One of these operator circuits, or a supplemental operator circuit not illustrated introduces the constant $m$ and the values given above are correct to within this constant $m$. The operations described may, if desired, be carried out in a different sequence, the important thing being that the overall transfer function be effected by computer element 12.

Figure 3:
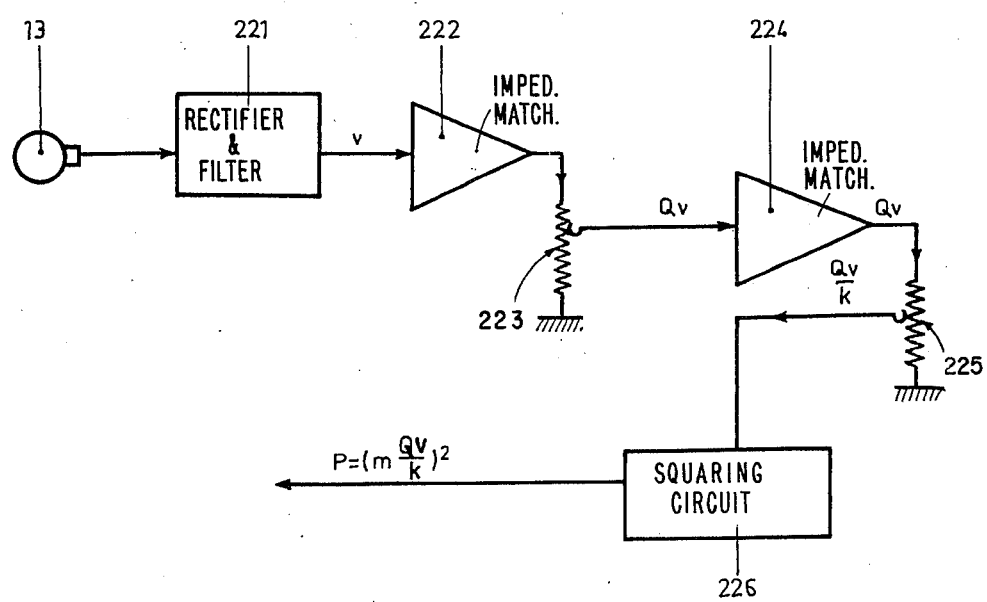
FIG. 3 is a block diagram of such a computer element utilizing analog techniques.

A preferred embodiment of the computer element utilizes analog techniques. This embodiment is illustrated in FIG. 3. Its performance is adequate and its cost is low. Its structure differs slightly, in certain details, from that of the previously described computer element. Specifically, the speed detector 13 is connected to the input of a rectifier and filter stage 221 which produces the potential $v$ applied to an impedence matching circuit 222. The output of matching circuit 222 is connected to a decade potentiometer box, diagrammatically represented at 223, which constitutes both the Q setting device and the multiplier. The potential developed at the poteniometer cursor is therefore Qv. This cursor is connected to the input of a second matching circuit 224, also driving a decade potentiometer box 225, and constituting both the k setting means and the divider. At the cursor of this potentiometer there therefore appears Qv/k. The cursor is connected to the input of a squaring circuit 226, at whose output there is developed the reference signal. The constant m is introduced at any desired stage, the values being accurate to within that constant.

Figure 4:
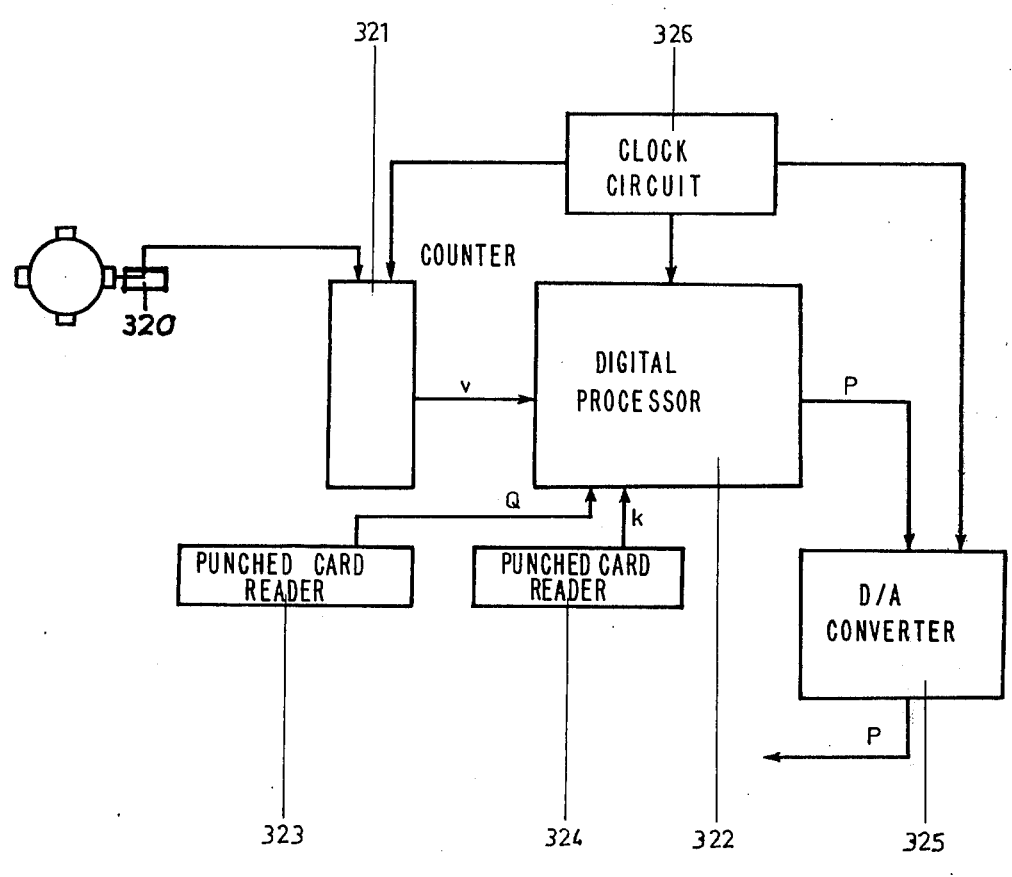
FIG. 4 is a block diagram of such a computer element utilizing digital techniques.

The computer element may also utilize essentially digital techniques. This is illustrated in FIG. 4. The tachometer generator may again be utilized and its frequency counted. Alternatively, it may be replaced by a sensor 320 which derives, for example, a number of pulses equal to the number of meters traversed during a given interval.

These pulses may be supplied to a counter 321, which therefore accumulates the numerical value of the speed. The output of counter 321 is supplied to a digital processor 322, to which are also applied the quantities Qk derived from the setting means (not shown) via digitizing circuits 323, 324. The output of processor 322 is connected to the input of a digital-to-analog (D/A) converter 325, which puts out the voltage corresponding to P. The system is synchronized by a clock 326, supplying its output signals to counter 321, to processor 322 and to D/A converter 325.

The digitizing circuits may be separate from the setting means, or they may provide both functions simultaneously, as would be the case for code wheels, digital keyboards, magnetic card readers, etc. Preferably, punched card readers are utilized for digiting devices 323, 324 in FIG. 3, because of the small space required by punched cards, whose reading is performed through their perforations simultaneously.

Another embodiment, not illustrated, may utilize both analog and digital matchers and also D/A and/or A/D converters. For example, all of the processors may be analog (such as logarithmic amplifiers) while the setting means are digital.

Regulator 10 is connected to the output of computer element 12 (see FIG. 1) and has the task of establishing in distribution chamber 7 a pressure proportional to the reference signal, by means of regulator valve 6. This valve 6 is controlled by servo motor 9, whose direction of rotation depends upon the polarity of the error, i.e. upon the polarity of the difference between the reference signal and the pressure signal from manometer 11.

Figure 5:
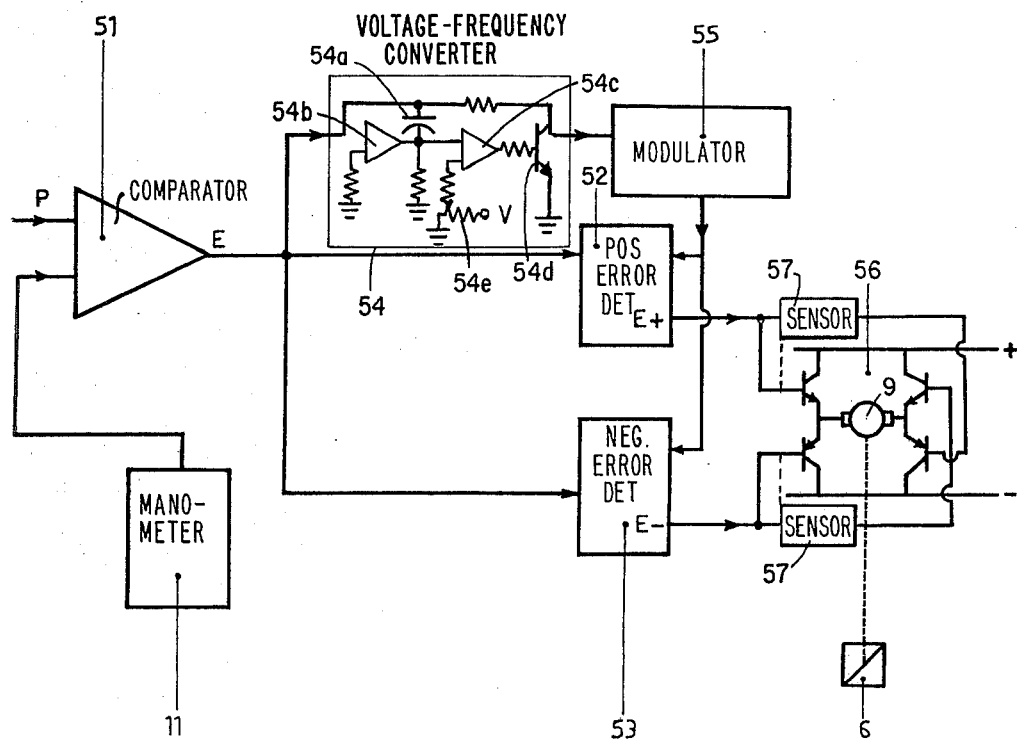
FIG. 5 is a block diagram of a control regulator suitable for the spreader system.

This difference is determined by a comparator 51 (see FIG. 5) whose output is connected to a positive error detector 52 and a negative error detector 53. The output of comparator 51 is also supplied to a voltage-frequency converter 54 driving a modulator 55 whose purpose is the stabilization of the servo control. The frequency of modulator 55 depends on the magnitude of the error and its output is introduced into error detectors 52, 53. The outputs of the error detectors are connected to the control circuit 56 for servo motor 9. This motor turns in response to pulses which are more and more closely spaced with increasing error. Consequently, the pressure has time to stabilize during the interval which separate two successive adjustments in the position of the regulator valve 6.

The overall system of converter 54 and modulator 55 may be in the form of integrated circuit stages and/or cascaded transistors. A capacitor 54a is charged through a first stage 54b with a current which is a function of the error. The greater the error, the more rapid the charge. The succeeding stage 54c may constitute a charge level detector, which controls an output transistor 54d which discharges the capacitor rapidly as soon as a predetermined charge level is reached. Voltage divider 54e sets this predetermined charge level. Consequently, the frequency increases with increasing error voltage.

Each of detectors 52, 53 may comprise a relay in its collector circuit. The contacts of these relays determine the state of the branches of a bridge circuit controlling servo motor 9 and, therefore, the direction of current flow supplied to this motor 9, and with it its direction of rotation and that of the movable element of regulator valve 6.

A sensor 57 may be inserted in the output lead of each detector so as to control the stage of a safety device, such as a transistor, which prevents damage to the circuit elements if the system malfunctions.

This may happen, for example, if the pressure unexpectedly remains at too low or too high a level.

Figure 6:
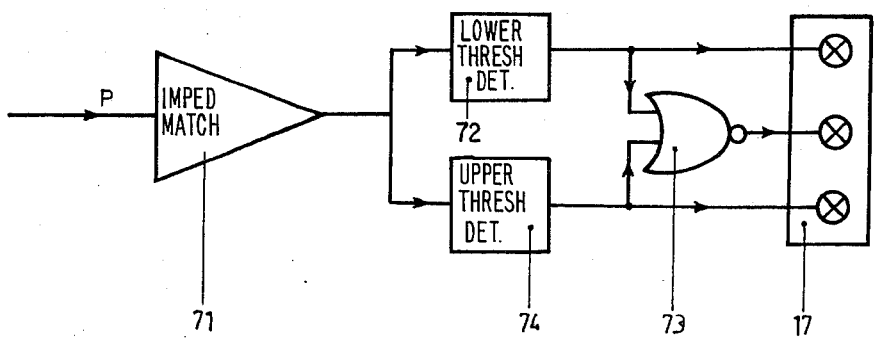
FIG. 6 is a block diagram of a safety and display device for the spreader.

Safety circuit 16 (see FIG. 1) receives a signal from computer element 12, via an impedance matching circuit 71 (see FIG. 6) which ocnstitutes its first stage. The output of this matching circuit drives two threshold detectors 72, 74. In practice, the nozzles can be used with good effect only within a certain pressure range, e.g. between a maximum value of 4 bars and a minimum value of 1 bar. Beyond this range, the dispersion becomes irregular. Therefore, if the pressure drops below 1 bar it is desirable to speed up and if it exceeds 4 bars it is desirable to slow down. A lower threshold detector 72 controls both a display light marked "speed up" which forms part of the visual display device 17 and, also, a gate 73. Likewise, upper threshold detector 74 controls a display light marked "slow down"also forming part of the visual display device 17, and also the gate 73. When detector 72 operates, the corresponding display lights up. When detector 74 operates, the display corresponding to it lights up. When both detectors are addressed, then the third display light marked "normal", which is controlled by the gate, lights up. When it becomes impossible to extinguish one or the other of the two speed up or slow down lights even though the prescribed operation has been carried out, the nozzles must be changed, because this indicates that they are inappropriate for the type of spraying to be performed.

In summary, pump 3 draws the material to be spread from reservoir 1 and injects it into sprayer manifold 8 via distribution chamber 7. Regulator valve 6 is opened as a function of the measured speed, the desired output, and the type of nozzles utilized. If the pressure in distribution chamber 7 varies, or if the speed, the output or the type of nozzles used has to be changed, there develops a difference between the pressure signal and the reference signal provided by computer element 12. This voltage difference produces rotation of servo control 9, and a consequent change in the setting of regulator valve 6, and with it in the pressure in distribution chamber 7. When this pressure does not equal the desired pressure, servo motor 9 is caused to rotate by impusles which are more widely spaced as the pressures approach each other, and this continues until their equalization is achieved.

It will be understood that the invention is not limited to the embodiments described and shown above, but that others will occur to those skilled in the art without departing from the scope of the invention.

I claim:

1. In a vehicle-carried spreader system which includes a reservoir for the material to be spread, a distribution chamber connected to the outlet of the reservoir, return connection means from the outlet back to the reservoir, valve means regulating the flow of the material in the return connection means and means for measuring the pressure in the distribution chamber, the improvement which comprises:
   input means for setting in the desired value of spreader output and for setting in a value characteristic of spray nozzles used by the spreader system;
   means for measuring vehicle speed;
   means for utilizing the set-in values and measured speed to produce a reference value;
   means for comparing the reference value with the measured pressure; and
   means for controlling the valve means in accordance with the comparison.

2. The system of claim 1, wherein said chamber pressure measuring means is a manometer.

3. The system of claim 1, wherein said speed measuring means comprises means for sensing the speed of a non-driving wheel of said vehicle.

4. The system of claim 1, wherein said reference value producing means includes means for dividing said set-in desired spreader output value by said set-in nozzle characteristic value, means for multiplying the result of the division by said measured speed and means for squaring the result of said multiplication to produce said reference value.

5. The system of claim 4, wherein said speed measuring means comprises a pulse generating means connected to said multiplying means, and further comprising means for transforming said values into digital data, digital processing means, and clock means for timing the digital operations of the system.

6. The system of claim 4, wherein at least one of the said set-in means is digital, and comprising further a D/A converter means, and wherein said dividing means, multiplying means, and squaring means are analog.

7. The system of claim 4, further comprising means for deriving an error signal from said comparison between reference value and measured pressure and means for controlling a servo motor in response to said error signal, said servo motor in turn controlling said valve means.

8. The system of claim 7, wherein said means for deriving an error signal includes a voltage- frequency converter, and a modulator driven thereby, whereby said error signal is produced in the form of signals spaced in time by intervals which become longer as the difference between measured pressure and reference value becomes smaller.

9. The system of claim 8 wherein said voltage-frequency converter comprises a capacitor charged by a signal which is a function of said comparison between reference value and measured pressure a detector for sensing the capacitor charge level, and a circuit for discharging the capacitor in response to attainment of a predetermined charge level.

10. The system of claim 1, wherein said input means comprise means for reading punched cards coded with the desired value of spreader output and the type of spray nozzle used.

11. The system of claim 7, wherein the means for controlling the servo motor includes a bridge circuit with several arms, and means for determining the state of at least one bridge arm to control the servo motor, and sensing means responsive to circuit malfunction.

12. The system of claim 7, comprising safety means having upper and lower threshold detectors supplied with said reference value, a gate supplied with the output of both said threshold detectors, and separate visual display means, respectively activated by said threshold outputs and the output from said gate.

* * * * *